April 29, 1930.　　　C. E. BROBERG　　　1,756,339
ADJUSTABLE HANDLE BAR FOR BICYCLES, MOTOR
BICYCLES, AND THE LIKE VEHICLES
Filed Aug. 7, 1928

Inventor:
Charles E. Broberg
By Peter M. Bocsny
Attorney

Patented Apr. 29, 1930

1,756,339

UNITED STATES PATENT OFFICE

CHARLES EMANUEL BROBERG, OF COPENHAGEN, DENMARK

ADJUSTABLE HANDLEBAR FOR BICYCLES, MOTOR BICYCLES, AND THE LIKE VEHICLES

Application filed August 7, 1928, Serial No. 297,945, and in Denmark January 19, 1928.

The present invention relates to improvements in adjustable handle bars for bicycles, motor bicycles and the like vehicles.

It is a well known fact that the putting up of a bicycle in a cycle shed, where there are already a number of cycles, affords a great deal of difficulties, particularly owing to the fact that the handle bars of the various cycles catch into each other on account of the larger space they take in relation to the breadth of the cycle itself. To overcome these difficulties there have been constructed handle bars to fold down, thereby economizing the space taken up by the cycle. The present invention relates to an improvement in such adjustable or folding handle bars and is mainly characterized by the laterally extending arms of the handle bar being arranged to lock in their open (operative) position as well as in their closed (folded down) position by means of a single locking device that is operative, whether the handle bar is open or closed down. This device may for instance comprise a lock bolt which in either position of the handle bar engages a lock plate or the like attached to the handle bar, and which device may be released by means of a suitable key.

This combination of handle bar and lock device serves simultaneously as lock against unauthorized removal of the cycle, because the handle bar when folded down renders it impossible to ride the cycle.

Figure 1:
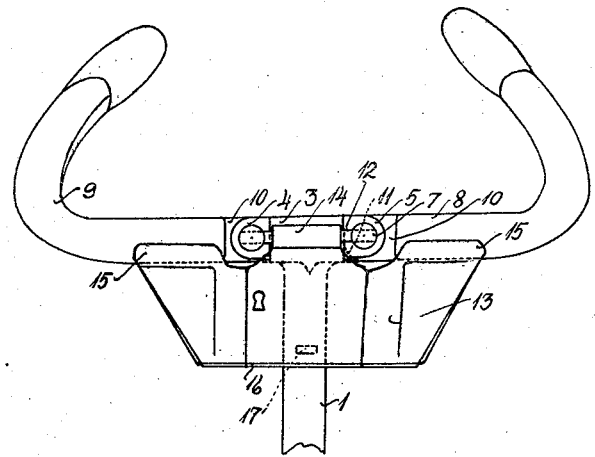
Figure 2:
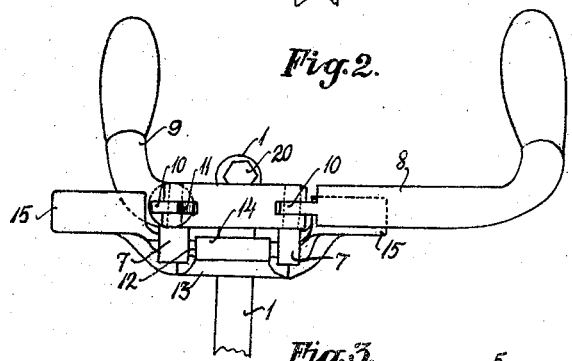
Figure 5:
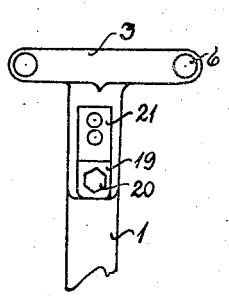
Figure 3:
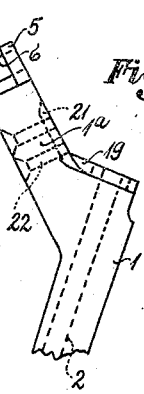
Figure 4:
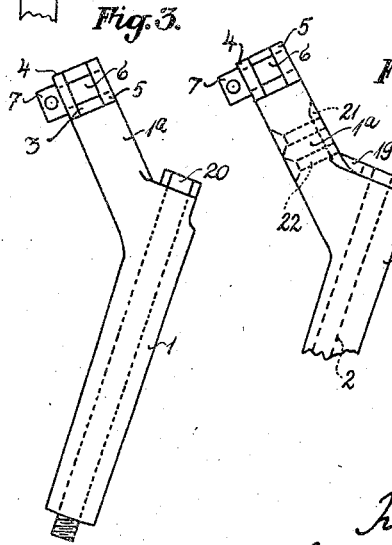

One manner of constructing the invention is illustrated in the accompanying drawing, where Fig. 1 is a front elevation of the handle bar according to the invention in open operative position, Fig. 2 a plan elevation of same showing the one (the right hand) arm in operative position and the other arm folded down, Fig. 3 a side elevation of the handle bar stem, Fig. 4 a side elevation of another form of the handle bar stem, and Fig. 5 a rear view of same.

The handle bar is attached to the frame of the cycle by means of the stem 1, and is held here by means of a clamp bolt 2. The stem 1 has on its upper end an extension 1ª ending at the top in a cross piece 3 provided at each end with two lugs 4, 5, through which is screwed a bolt 6, provided on its forward extending end with a comparatively high head 7. Between the lugs 4, 5 on either end of the cross piece 3 the two laterally extending arms 8, 9 of the handle bar are arranged rotatably on the bolts 7, each arm having a butt 10 fitting in between the lugs 4, 5. The butts 10 are rounded on their lower part, whereas the upper parts are squared and abut the cross piece 3 when the handle bars are in their open operative position. The heads 7 of the bolts 6 are each provided with a threaded hole through which a spindle 12, Figs. 1 and 2, is screwed. This spindle 12 serves as hinge for the lock plate 13, having at top a lug 14 engaging the spindle 12. The lock plate 13 has furthermore on each side a bracket 15 with hollow in which the laterally extending arms 8, 9 rest when the handle bar arms are in operative position. The brackets 15 are arranged in such a manner that in connection with the lock plate 13 they form a U-shaped yoke engaging the arms of the handle bar when folded down, see Fig. 2. The inner side of the lock plate 13 carries a lock 16 which, when the lock plate is pressed up against the extension 1ª on the stem 1 of the handle bar, locks this to the stem by means of a lock bolt in the lock engaging an eye 17 attached to the extension 1ª. It is thus evident that the lock plate with lock firmly holds the arms of the handle bar in either of their extreme positions, that is either when opened in operative position, or when folded down in inoperative position. The lock bolt of the lock 16 is turned out of engagement with the eye 17 by means of a key, which is inserted into the key hole 18 and turned, while the lock plate 13 is simultaneously turned upon the spindle 12.

In order to render impossible the removal of the handle bar from the cycle, this being effectuated by loosening the clamp bolt 2, there is arranged in accordance with the invention a plate 19, Figs. 4 and 5, around the heads 20 of the bolt. This plate is of the same height as the bolt head 20 and fits tightly around it, and is furthermore provided with an extension 21 inserted within a cutting in the the extension 1ª of the stem 1, thereby preventing the application of a key to the head of bolt 20. To maintain a firm hold of the plate 19 to the handle bar the extension 1ª is provided with screws 22 that enter corresponding screw holes in the extension 21. The heads of these screws 22 are lowered level with the surface of the extension 1ª, and are covered by the lock plate when locked to the handle bar, and therefore cannot be removed from the plate 19, 21. Thus the plate 19, 21 is prevented from being removed to allow the loosening of the clamping bolt and consequently the removal of the handle bar.

The lock device described in the above may be varied in many ways within the scope of the invention.

I claim:—

1. In handle bars for motor cycles, cycles and the like vehicles, the combination of two laterally extending arms, means for attaching these arms rotatably to the handle bar stem, a lock plate with two brackets engaging the arms of the handle bar in either their open operative position or in their folded down inoperative position, means for locking said lock plate with the handle bar arms in either of the extreme positions, to the effect that when the arms are locked in their folded down position unauthorized removal of the vehicle is prevented.

2. In handle bars for motor cycles, cycles and the like vehicles, the combination of laterally extending arms, a lock plate rotatably attached to the handle bar stem, a clamp bolt holding said stem to the frame of the vehicle, around the head of said bolt a tightly fitting plate with an extension lowered into a cutting in the handle bar, and attached here by means of screws arranged in such a manner that their heads are covered by the lock plate.

In testimony whereof I affix my signature.

CHARLES EMANUEL BROBERG.